July 6, 1954     P. H. HARRER ET AL     2,682,945
PICKUP BALE LOADER

Filed March 27, 1950     3 Sheets—Sheet 1

Inventors
Paul H. Harrer
Raymond C. Fischer
by Kenneth C. McKiett
Attorney

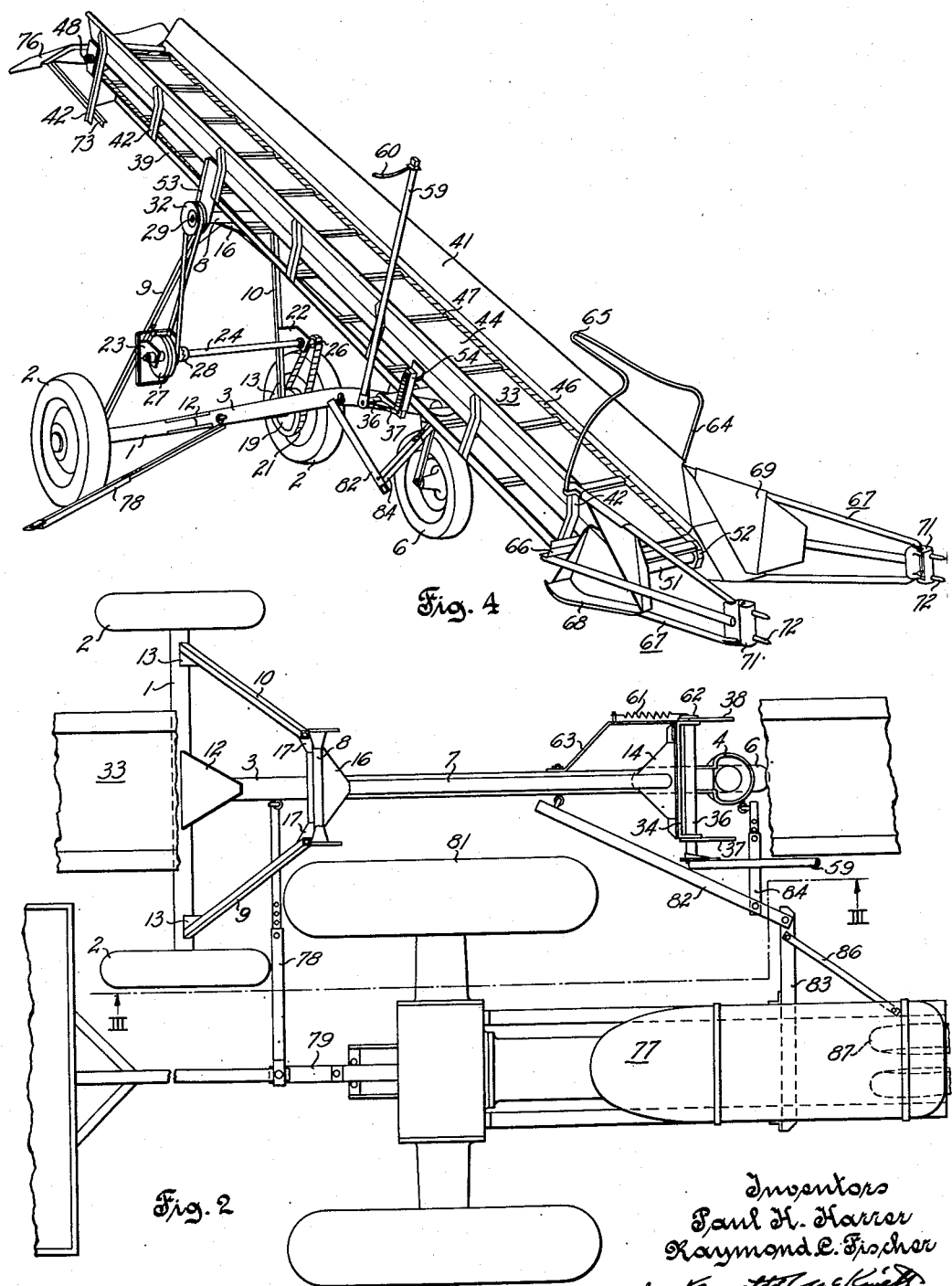

July 6, 1954
P. H. HARRER ET AL
PICKUP BALE LOADER
2,682,945
Filed March 27, 1950
3 Sheets-Sheet 3
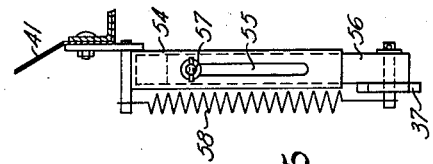
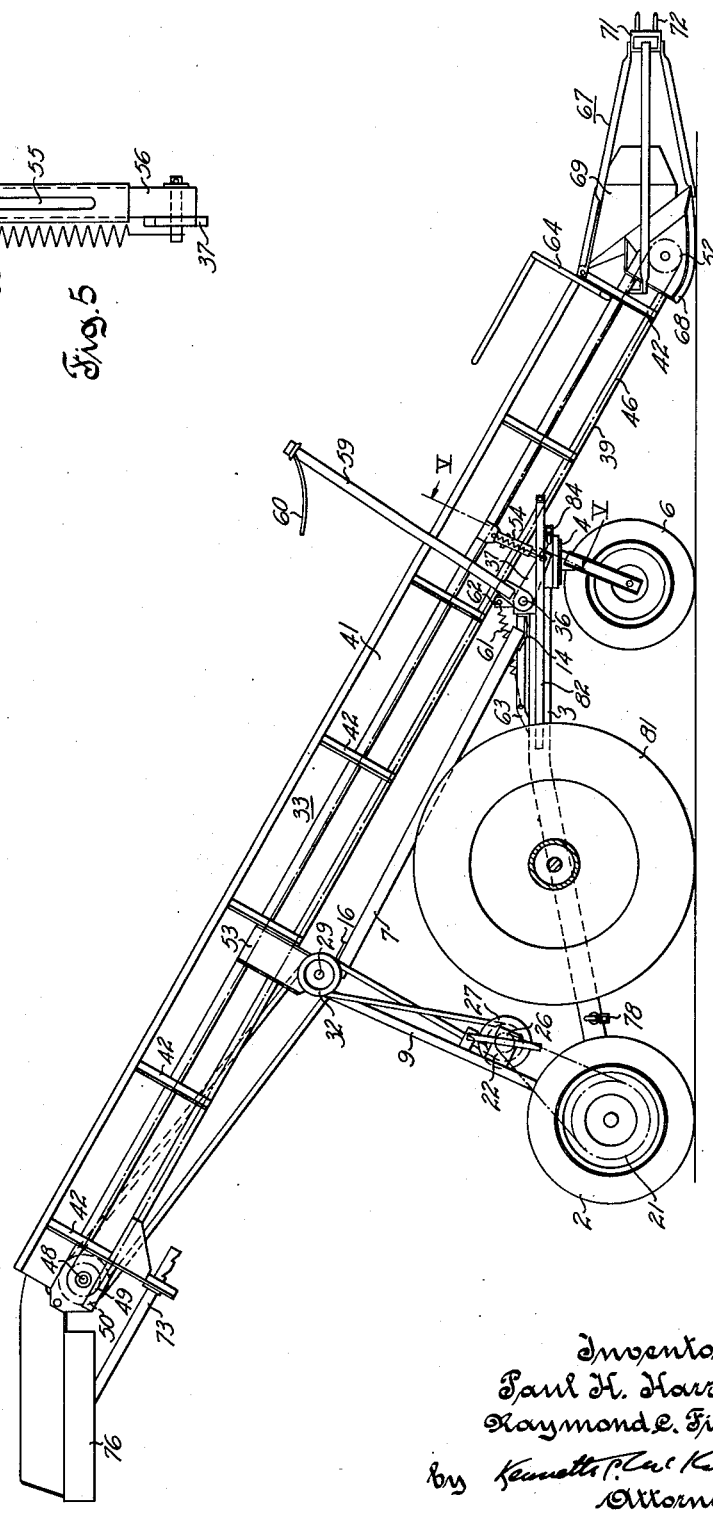
Inventors
Paul H. Harrer
Raymond L. Fischer
by Kenneth P. W. Knett
Attorney Patented July 6, 1954

2,682,945

UNITED STATES PATENT OFFICE 2,682,945

PICKUP BALE LOADER

Paul H. Harrer and Raymond C. Fischer, La Porte, Ind., assignors to Allis-Chalmers Manufacturing Company, Milwaukee, Wis.

Application March 27, 1950, Serial No. 152,088

5 Claims. (Cl. 198—11)

This invention relates generally to vehicle propelled loaders of the type designed to pick up bales from the ground and deliver the bales to a wagon or the like hitched in trailing relation to the propelling vehicle, and is more particularly concerned with the provision of an improved loader combined or combinable with any suitable propelling vehicle (hereinafter called tractor) in a novel manner affording one or more of the advantages hereinafter set forth.

More specifically, an object of the present invention is to provide a mobile loader incorporating improved features of construction enabling the loader to be detachably coupled alongside a tractor in a novel manner minimizing side draft effects during forward travel, even when the rear wheels of the tractor are adjusted to afford maximum tread spacing. Stated differently, a loader in accordance with this invention may be thus readily combined with a tractor having its rear wheels adjusted for maximum tread spacing without first reducing the spacing of such wheels.

Another object of this invention is to provide a mobile loader incorporating improved tractor attaching parts and features of construction affording quick coupling of the loader to various tractors of different manufacturers.

Still another object of the present invention is to provide an improved mobile loader and tractor combination wherein the relationship of proximate loader and tractor is such that the upper end of the fore and aft loader conveying mechanism is in position to deliver material into a trailing mobile receptacle hitched directly behind the tractor without the aid of a cross conveyor.

And a further object of this invention is to provide a side attached mobile loader incorporating parts constructed and combined in a novel manner affording a rigid, durable and simple construction minimizing initial cost and the effort required in the attachment and detachment of the loader to a tractor.

Accordingly the invention may be considered as comprising the various features of construction and/or combination as is hereinafter more fully set forth in the detailed description and appended claims, reference being had to the accompanying drawings, wherein:

Fig. 2 is a plan view of a loader, tractor, wagon combination with the bale pickup apparatus removed and the elevating conveyer broken away in part, to better show the loader frame structure and hitch connections;

Fig. 3 is a side elevation of the loader and near tractor rear wheel taken on line III—III of Fig. 2; and Fig. 4 is a front tractor-side perspective view of the loader detached from the tractor.

Fig. 5 is an enlarged view of a detail taken on line V—V of Fig. 3.

Figure 1:
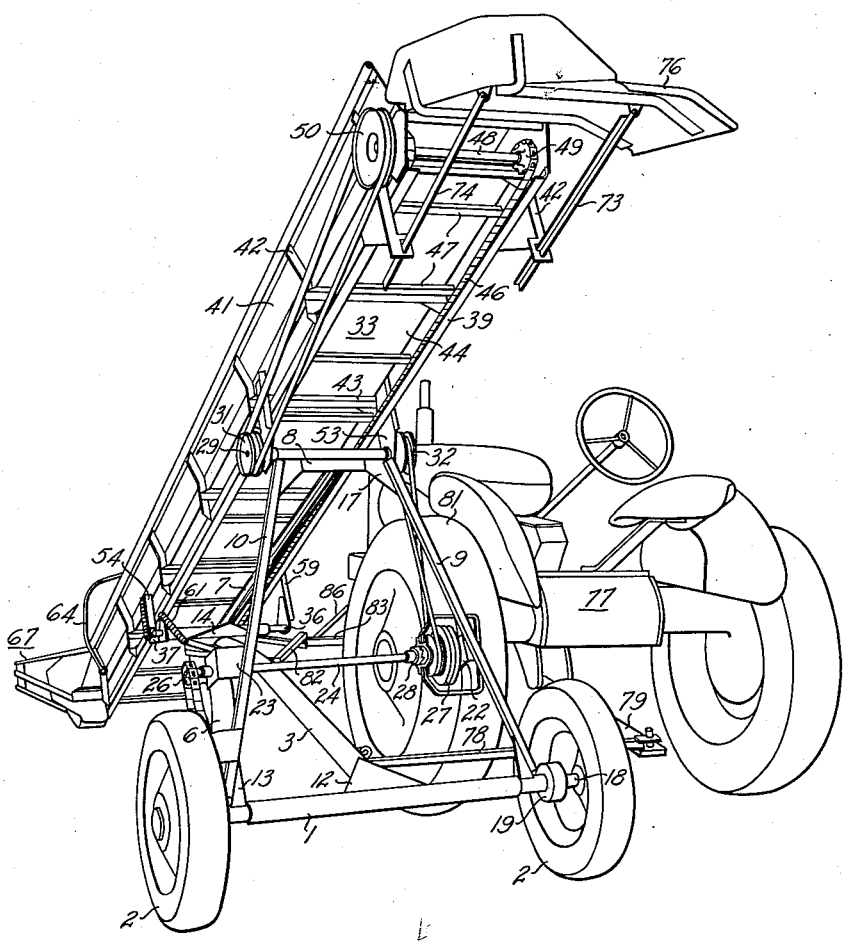
Fig. 1 is a perspective view of a mobile loader tractor combination embodying the invention, as seen from the left rear side thereof.

Referring to the drawings, it will be seen that the loader or implement includes a base frame comprising a transverse axle structure 1 mounting a pair of ground engaging wheels 2 at opposite ends thereof, a rigid tubular member 3 extending forwardly from a midportion of axle structure 1 in slightly upwardly arched relation and carrying a support 4 (see Figs. 2 and 3) at its forward end mounting a depending castering wheel 6, and an upper tubular member 7 having its lower forward end fixedly united with the top portion of lower member 3 in rearward adjacent relation to caster wheel support 4. Member 7 extends upward and rearward in overlying relation to lower member 3 and has its rear end fixedly secured to the upper midportion of an isoceles trapezoidal support comprising a transverse member 8, positioned parallel to axle structure 1, and depending nonparallel side members 9 and 10 having their lower ends fixedly secured to outer portions of axle structure 1 in symmetrical relation to the portion thereof joined with lower frame member 3. The junction of axle structure 1 with lower member 3 and with the nonparallel members 9 and 10 may include reinforcing gusset plates 12 and 13, respectively. And the junction of upper member 7 with lower member 3 and with transverse member 8 may be similarly reinforced by gusset plates 14 and 16, respectively. Likewise, gusset plates 17 may be employed to reinforce the connection between transverse member 8 and the nonparallel members 9 and 10.

Tubular axle structure 1 (note particularly Figs. 1 and 4) rotatably encloses a shaft (not shown) operatively connected with each wheel hub 18 by means of a housing 19 enclosing conventional ratchet drive mechanism (not shown), it being understood that this mechanism, which may be similar to that disclosed in U. S. patent J. J. Kulage, No. 568,770, for Gathering and Loading Apparatus, granted October 6, 1896, affords a differential action between the wheels 2 when the loader is making a turn. A portion of the ratchet housing 19 which is fixed to the wheel hub 18 adjacent the outermost wheel 2 mounts a chain sprocket 21 which thereby rotates whenever the loader is traveling forward. The nonparallel sides 9 and 10 of the trapezoidal support are provided with laterally aligned brackets 22 and 23, respectively, rotatably supporting a transverse shaft 24 parallel to axle structure 1, one end of this shaft mounting a sprocket wheel 26 which is aligned and chain connected with the drive sprocket wheel 21 on ratchet housing 19. The other end of shaft 24 is drivingly connected with a V-belt pulley 27 through means of a conventional clutch 28. V-belt pulley 27 has additional pulleys thereon which can be utilized when it is desired to operate the loader in a stationary position by using a power source instead of the ground drive herein shown. When pulley 27 is power driven, clutch 28 is moved to a disengaged position. The upper transverse portion 8 of the trapezoidal support mounts a transverse shaft 29 which is parallel to shaft 24 and has its opposite ends provided with V-belt pulleys 31 and 32 mounted for rotation therewith, the latter pulley being disposed in driven alignment with respect to stepped pulley 27 on shaft 24.

The upper transverse portion 8 of the trapezoidal support constitutes a rear upper support for an intermediate portion of an endless conveyer 33, and the forward portion of lower base frame member 3, that is a portion immediately in advance of the junction of upper frame member 7 therewith, is provided with a transverse forward support 34 mounting a rock shaft 36 provided at opposite ends with bell-crank levers 37 and 38 secured thereto for movement therewith. The previously described endless conveyer supports are positioned in longitudinal alignment and support an endless conveyer frame structure comprising a pair of laterally spaced parallel base rail members 39 and a pair of vertically extending upwardly flaring side walls 41 secured in vertically spaced relation to base rails 39 by means of similar series of longitudinally spaced vertically extending side frame elements 42 and by means of a series of similarly spaced cross members 43, the latter supporting a suitable floor structure 44 over which travels an endless raddle type conveyer comprising parallel side chains 46 interconnected by a series of transverse bars 47. The upper end of the conveyer frame structure mounts a transverse shaft 48 provided with a sprocket wheel 49 adjacent each end thereof over which pass the chains 46, the offside end of this shaft being also provided with a V-belt pulley 50 disposed in aligned relation to the pulley 31 on the upper transverse shaft 29 carried by the base frame structure as is shown in Fig. 1. The lower forward end of the conveyer frame structure rotatably supports a longitudinally ribbed cylindrical pickup member 51 (see Fig. 4) provided with sprockets 52 at each end thereof engaged by the conveyer chains 46. An intermediate portion of the conveyer frame structure is provided with a pair of laterally aligned depending support members 53 having a journaled engagement with opposite outer end portions of cross shaft 29, immediately adjacent pulleys 31 and 32, to thereby provide a rear pivot support for the conveyer. The forward portion of the conveyer frame structure is provided with a pair of laterally aligned depending hollow support elements 54 (see Figs. 3 and 5) each having substantially vertically extending opposed slots 55 in the sides thereof extending from a point adjacent to the attachment of the hollow supports to the conveyer frame to a point just short of the depending ends of the hollow supports. Each hollow support member slidably receives therein a link 56 which has a cross pin 57 in the upper end thereof and which cross pin has end portions extending into the slots in the hollow support member so that when relative sliding motion takes place between the hollow support members and the links, the slots provide guides and stop positions for this sliding motion. The lower ends of links 56 are pivotally connected to bell crank arms 37 and 38. Springs 58 at attached between the upper end of hollow support members 54 and the outer ends of bell crank arms 37 and 38 and function to bias links 56 into the hollow support members.

Also attached to rock shaft 36 on the tractor side of the loader is a bell crank lever 59 which extends upward alongside and to a point a considerable distance above the top edge of the near side conveyer wall 41. A line 60 or other flexible means is attached to the upper end of bell crank lever 59 and to a portion of the tractor adjacent the operator's station so that the line can be readily reached from the operator's station on the tractor (not shown). A pull on line 60 causes rock shaft 36 to pivot in a counterclockwise direction as viewed in Fig. 3 which movement causes bell crank arms 37 and 38 to push upwardly on links 56 and being additionally urged by the bias of spring 61 which is pivotally connected at the forward end thereof with a bell crank lever 62 attached to rock shaft 36 and which spring is pivotally connected at its rear end to a fixed part 63 on an intermediate portion of base frame member 3.

Thus by pulling on line 60 and causing levers 59, 37 and 38 to pivot, resulting in an upward thrust on links 56 which thrust is transmitted to the hollow support members 54 by means of the pins 57 contacting the upper ends of slots 55 thereby causing an upward movement of the front end of the conveyor frame about axle 29, the operator on the tractor is able to prevent the front end of the conveyer from striking an obstruction. Upon release of the pull on bell crank lever 59 by the operator, the forward end of the conveyer will descend to normal operating position by reason of the weight of the front end acting against the bias of spring 61.

If an obstruction unseen by the operator is struck by the front end of the conveyer, the forward end thereof will move upwardly aided by the bias of spring 61 in the same manner as described in the preceding paragraph. However, if an obstruction is of such height as to tend to raise the front end of the conveyer to a height greater than that permitted by this previously described raising mechanism, then hollow support members 54 will slide upwardly away from links 56 against the bias of springs 58 and if the force tending to pivot the front end of the conveyer upwardly is sufficient, the upward sliding movement of the hollow support members relative to the links will continue until further movement is prevented by pins 57 contacting the lower ends of the slots 55 in the hollow support members. After the condition causing this upward movement of the front end of the conveyor has passed, the front end of the conveyer will drop down urged by springs 58 and against the bias of spring 61 until the normal operating position of the front end of the conveyer is obtained and in this position hollow members 54 have slid over links 56 until further sliding movement is prevented by pins 57 contacting the upper end of slots 55.

The two foremost laterally aligned side frame elements 42 mount an upstanding rod member 64 bent to form a rearwardly extending loop 65, this rod member being designed to prevent bales or the like from traveling up the conveyer in an up-ended position. The forward portion of the conveyer frame is also provided with a rigid transverse cross member 66 disposed immediately in advance of the bottom portion of the foremost side members 42, and these two side members and the cross member 66 associated therewith mount a pair of similar forwardly extending throat forming and material directing members 67 comprising ground engaging shoe portions 68, and side walls 69 forming forwardly flaring extensions of the lower end of conveyer side walls 41, the forward end of each member 67 pivotally supporting a bale or other material engaging element 71 presenting one or more forwardly projecting prongs 72. The actual construction of these material directing and confining members are not essential to a complete understanding of the present invention and if detailed information is desired as to the construction and operation of these members attention is directed to U. S. Patent No. 2,409,143 to E. M. McElhinney and J. A. Podhajsky, granted October 8, 1946, Loader. The two rearmost side frame elements 42 extend below the base rails 39 and slidably adjustably mount two parallel rearwardly extending bars 73 and 74 having their rear ends pivotally supportedly connected with a bale receiving and diverting platform 76 having its forward edge hingedly connected to the upper rear end of the conveyer frame with the floor of the platform forming a rearward extension of the upper end of the conveyer floor.

Referring particularly to Fig. 2 it will be noted that the mobile loader or wheeled vehicle is detachably connected alongside a conventional tricycle type tractor 77 by means of a rear connection comprising a longitudinally adjustable rigid element 78 having its inner end pivotally connected with a central rear portion of tractor 77, namely, the rear end of drawbar structure 79, and having its other end pivotally connected with a side portion of lower base frame member 3 slightly in advance of axle structure 1 so that this member passes in front of the adjacent loader wheel 2 and immediately to the rear of the adjacent rear wheel 81 of tractor 77. The forward connection between the mobile loader and tractor comprises an elongated rigid member 82 having its rear portion pivotally connected to a side portion of lower base frame member 3 somewhat to the rear of the junction between this member and the forward end of upper member 7 and having its forward end pivotally connected with a side projection 83 fixedly secured to a forward portion of tractor 77, and comprises a transversely adjustable rigid member 84 having its outer end pivotally connected with an adjacent portion of caster wheel support 4 and having its inner end pivotally connected with an intermediate portion of rigid member 82, preferably adjacent the point of connection between the latter and the fixed tractor carried part 83. If desired, fixed part 83 may be additionally braced by a rigid member 86 connecting an outer portion thereof with an adjacent forward side portion of the tractor, preferably to the rear of the tractor front dirigible wheel support 87.

Referring again to Fig. 2 and also to Fig. 3 it will be noted that the loader base frame structure embodies a tricycle arrangement of the ground supporting wheels with a front castering wheel disposed in advance of the near rear tractor wheel and with the innermost wheel disposed in trailing relation to such tractor wheel. In addition it will be noted that the angle of inclination of the elevating conveyer is such that the adjacent tractor and loader rear wheels may be relatively disposed as shown in Fig. 2, which represents a condition wherein the rear tractor wheels are adjusted in a conventional manner, by means not shown, to afford maximum tread spacing, or in a position wherein the near rear wheel of the loader is disposed directly behind the tractor wheel. As previously indicated this arrangement, including the means for connecting the loader to the tractor, permits the loader to be operatively coupled alongside a tractor without first adjusting the tread spacing of the rear tractor wheels. Moreover, this loader may be mounted alongside different makes of tractors since all that has to be done is to make proper longitudinal adjustment of the fore and aft attaching elements 84 and 78, respectively. Furthermore, it should be apparent that the loader may be readily connected or disconnected from a tractor simply by removing the detachable connection between member 78 and drawbar 79, and between member 82 and fixed tractor carried part 83. And it should now be obvious that apparatus constructed in accordance with this invention readily accomplishes all of the objects and affords all of the advantages hereinbefore set forth.

Therefore, it is to be understood that it is not intended to limit the invention to the exact details of construction and combination herein disclosed for purposes of illustration as various modifications within the scope of the appended claims may occur to persons skilled in the art.

It is claimed and desired to secure by Letters Patent:

1. In combination with a tractor having a dirigible support for the front end thereof and a pair of laterally spaced rear wheels, a loader detachably connected with said tractor to extend along one side thereof and comprising a generally rigid frame having a base including an elongated axle structure disposed in transverse relation to the normal direction of travel and behind the near one of said rear wheels, an elongated member extending forwardly from a central portion of said axle structure to a point in advance of said near wheel, a castering wheel supporting the forward portion of said member, and a pair of wheels supporting opposite end portions of said axle structure with the one of said pair of wheels nearest the tractor disposed in trailing relation to said near wheel, said loader and tractor being detachably coupled by means of a rear connection including a rigid laterally disposed member adjustable as to length and having opposite end portions thereof pivotally connected with a rear central portion of said tractor and with said elongated base frame member at a point immediately in advance of said pair of supporting wheels, and by means of a front connection including a rigid first link having its rear end pivotally connected with said elongated base frame member at a point spaced forwardly from said rear connection and extending forwardly and laterally toward said tractor with its forward end pivotally connected to a fixed part on the adjacent forward side of the tractor, and including a rigid laterally disposed second link adjustable as to length and having opposite ends thereof pivotally connected with the forward end of said elongated base frame member and with an intermediate portion of said first link.

2. In combination with a tractor having a dirigible support for the front end thereof and a pair of laterally spaced rear wheels, a loader detachably connected with said tractor to extend along one side thereof and comprising a generally rigid frame structure having a tricycle arrangement of ground supporting wheels including a front castering wheel disposed in advance of the axis of said rear wheels, and a pair of laterally spaced wheels disposed rearward of said axis with the one of said pair of wheels nearest the tractor positioned in trailing relation to the adjacent one of said rear wheels, said loader and tractor being detachably coupled by means of a rear connection comprising a rigid laterally disposed member adjustable as to length and having opposite end portions thereof pivotally connected with a rear central portion of said tractor and with a side portion of said loader frame immediately in advance of said pair of supporting wheels, and by means of a front connection comprising a rigid first link having its rear end pivotally connected with a side portion of said loader frame in advance of said rear connection and extending forward and laterally toward said tractor with its forward end pivotally connected to a fixed part on the adjacent forward side of the tractor, and including a rigid laterally disposed second link adjustable as to length and having opposite end portions thereof pivotally connected with the front end of said loader frame and with an intermediate portion of said first link.

3. In combination with a tractor having a dirigible front support and a pair of laterally spaced rear wheels, a wheeled vehicle disposed adjacent one side of said tractor and being detachably coupled therewith by means of a rear connection comprising a rigid laterally disposed member adjustable as to length and having opposite end portions thereof pivotally connected with a rear central portion of said tractor and with a side portion of said wheeled vehicle intermediate the front and rear ends of the latter, and by means of a front connection comprising a rigid first link having a rear end pivotally connected with a side portion of said wheeled vehicle in advance of said rear connection and extending forward and laterally toward said tractor with its forward end pivotally connected to a fixed part on the adjacent forward side of the tractor, and including a rigid laterally disposed second link adjustable as to length and having opposite end portions thereof pivotally connected, respectively, with the front end of said wheeled vehicle and with an intermediate portion of said first link.

4. In combination with a tractor having a dirigible support for the front end thereof and a pair of laterally spaced rear wheels, an implement detachably connected with said tractor to extend along one side thereof and comprising a generally rigid frame having a base including an elongated axle structure disposed in transverse relation to the normal direction of travel and behind the near one of said rear wheels, an elongated member extending forwardly from a central portion of said axle structure to a point in advance of said near wheel, a castering wheel supporting the forward portion of said member, and a pair of wheels supporting opposite end portions of said axle structure with the one of said pair of wheels nearest the tractor disposed in trailing relation to said near wheel, said implement and tractor being detachably coupled by means of a rear connection including a rigid laterally disposed member and having opposite end portions thereof pivotally connected with a rear central portion of said tractor and with said elongated base frame member at a point immediately in advance of said pair of supporting wheels, and by means of a front connection including a rigid first link having its rear end pivotally connected with said elongated base frame member at a point spaced forwardly from said rear connection and extending forwardly and laterally toward said tractor with its forward end pivotally connected to a fixed part on the adjacent forward side of the tractor, and including a rigid laterally disposed second link having opposite ends thereof pivotally connected with the forward end of said elongated base frame member and with an intermediate portion of said first link.

5. In combination with a tractor having a dirigible support for the front end thereof and a pair of laterally spaced rear wheels, an implement detachably connected with said tractor to extend along one side thereof and comprising a generally rigid frame structure having a tricycle arrangement of ground supporting wheels including a front castering wheel disposed in advance of the axis of said rear wheels, and a pair of laterally spaced wheels disposed rearward of said axis with the one of said pair of wheels nearest the tractor positioned in trailing relation to the adjacent one of said rear wheels, said implement and tractor being detachably coupled by means of a rear connection comprising a rigid laterally disposed member having opposite end portions thereof pivotally connected with a rear central portion of said tractor and with a side portion of said implement frame immediately in advance of said pair of supporting wheels, and by means of a front connection comprising a rigid first link having its rear end pivotally connected with a side portion of said implement frame in advance of said rear connection and extending forward and laterally toward said tractor with its forward end pivotally connected to a fixed part on the adjacent forward side of the tractor, and including a rigid laterally disposed second line having opposite end portions thereof pivotally connected with the front end of said implement frame and with an intermediate portion of said first link.

References Cited in the file of this patent

UNITED STATES PATENTS

| Number | Name | Date |
|---|---|---|
| 1,478,482 | Marriott | Dec. 25, 1923 |
| 1,853,253 | Bennett | Apr. 12, 1932 |
| 2,267,303 | Jordan | Dec. 23, 1941 |
| 2,409,143 | McElhinney | Oct. 8, 1946 |
| 2,494,757 | Hansen | Jan. 17, 1950 |
| 2,518,083 | Sims | Aug. 8, 1950 |
| 2,530,496 | Watson | Nov. 21, 1950 |
| 2,542,446 | Abel | Feb. 20, 1951 |
| 2,542,448 | Alexander | Feb. 20, 1951 |